UNITED STATES PATENT OFFICE.

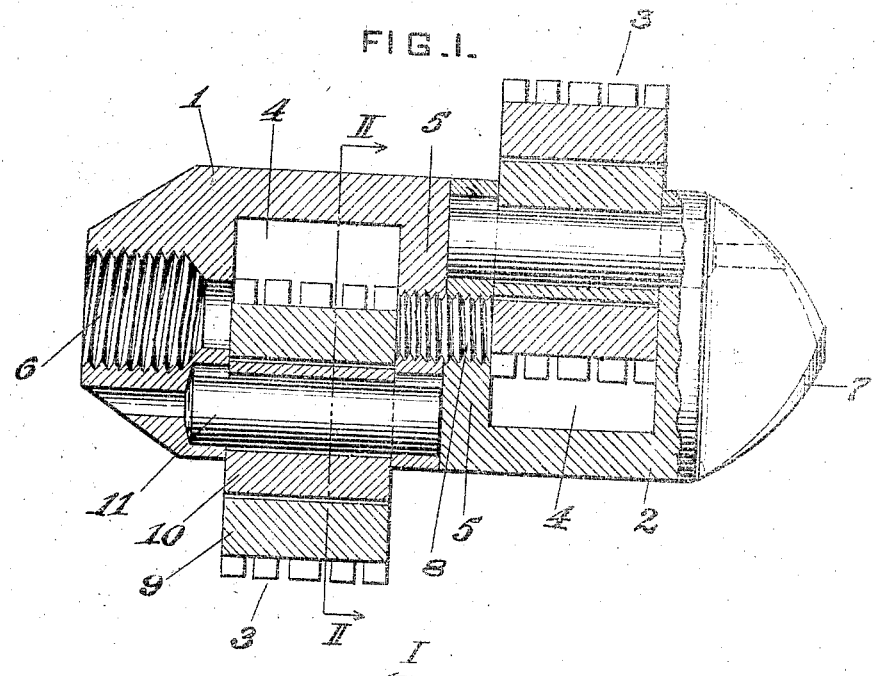
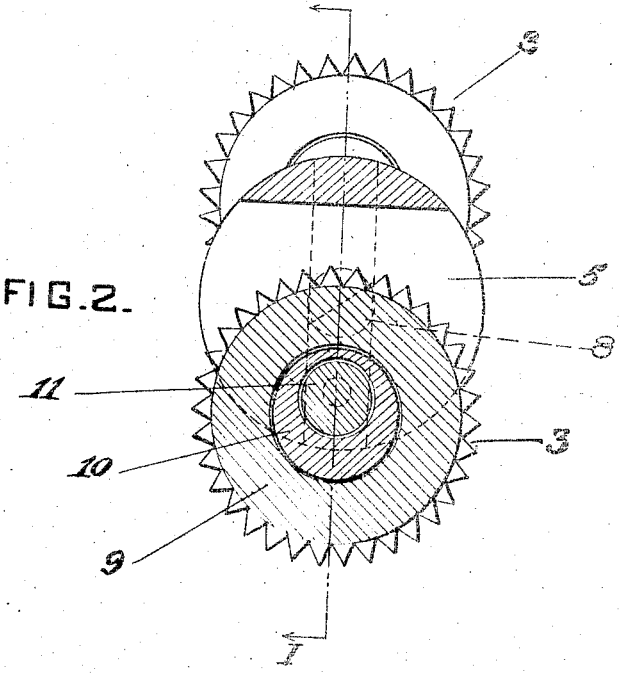

HARRIS B. HOLT, OF DORMONT, PENNSYLVANIA.

TUBE-CLEANER.

1,071,157.

Specification of Letters Patent. Patented Aug. 26, 1913.

Application filed June 18, 1913. Serial No. 774,428.

*To all whom it may concern:*

Be it known that I, HARRIS B. HOLT, residing at Dormont, in the county of Allegheny and State of Pennsylvania, a citizen of the United States, have invented or discovered certain new and useful Improvements in Tube-Cleaners, of which improvement the following is a specification.

My invention relates to boiler tube cleaners, comprising a head adapted to be rotated by a suitable motor and armed with cutter heads; and the object thereof is to provide a cleaner which will be simple in construction and effective in operation.

A further object of my invention is to provide a cleaner the several parts of which will not, due to the vibration during its operation, become loosened.

In the accompanying drawing, which forms part of my specification, I have illustrated the preferred embodiment of my invention.

Figure 1 is a longitudinal sectional view taken on the line I I, Fig. 2; and Fig. 2 is a transverse sectional view taken on the line II II, Fig. 1.

Like numerals are used to designate like parts.

Referring to the drawing, the cleaner comprises a two part carrier 1, 2, each part being provided with a cutter head 3. Each carrier portion has a general cylindrical shape and is provided with a recess 4 adapted to receive a cutter head, the adjacent ends of each portion consisting of a plane-faced plate 5. The carrier portion 1 forms the rear end of the cleaner, and is provided with a screw threaded hole 6 adapted to receive the rotatable shaft of a rotary motor, which is usually employed for the operation of such cleaners; while the carrier portion 2, which forms the front end of the cleaner, is provided with an integrally formed cutting tooth 7.

In order to connect the two carrier portions together, so that the rapid vibration of the cleaner during its operation will not loosen such connection, I form screw threaded holes in the central portion of each plate 5, and insert therein a screw 8, preferably of such length as to extend through but not beyond the plates 5. In threading the holes in the plates 5, the carrier parts are clamped together in such position that the open sides of the recesses 4 are on diametrically opposite sides of the axis of rotation. The cutters may then be evenly balanced upon the carrier. By such general arrangement the recesses 4 may be made sufficiently large to receive cutter heads of very substantial weight, which is a very desirable feature in tools of this character. Also, such construction affords a carrier comprising a minimum number of parts, and one whereof the operation effects a tightening rather than a loosening of its several parts.

The cutter heads are preferably cylindrical or ring-shaped members 9 provided on their peripheral surface with a plurality of teeth. Each head is rotatably mounted upon a cylindrical block 10, which in turn is rotatably mounted on a spindle 11, the hole in the block through which the spindle extends being eccentric with relation to the axis of the block. Each spindle is also rotatably mounted in one carrier part, the diameter of the holes in the carriers for receiving the spindles being substantially larger than the diameter of the bearing ends of the spindles; thus permitting a lateral vibratory motion of the cutter head, and preventing its wedging against the walls of the tube being cleaned. The spindle-bearing holes at the central portion of the carrier 1, 2 are formed by drilling holes through the plates 5, the spindles being inserted through these holes and retained in position by the plate 5 of the opposite carrier.

In operation, the centrifugal force of the rotating cleaner causes the cutter heads 9 to bear yieldingly against the wall of a tube being cleaned, the cutter heads rotating upon the eccentric blocks 10, which remain substantially in the position indicated in Fig. 1. The loose play of the spindles 11 in their carrier bearings permits of a vibratory action of the cutter heads against the tubes being cleaned.

I claim as my invention:

1. In a tube cleaner, the combination of a carrier, a spindle borne thereby, a rotatable cylindrical block provided with a hole adapted to receive said spindle, said hole being longitudinally but eccentrically disposed with relation to the axis of said block, and a cutter ring provided with a cylindrical opening and rotatably mounted on said block.

2. In a tube cleaner, the combination of a carrier provided with cylindrical spindle bearings, a spindle rotatably mounted in said carrier bearings and provided with cylindrical bearing portions substantially smaller in diameter than said carrier bearings, a cylindrical block rotatably mounted on said spindle provided with a spindle-receiving hole therein longitudinally but eccentrically disposed with relation to the axis thereof, and a cylindrical cutter head rotatably mounted upon said block.

3. In a tube cleaner, the combination of a carrier frame comprising two parts each being provided with a cutter head and each having adjoining plane faced plates transversely disposed with relation to the axis of said carrier, a spindle extending through the plate of each carrier-part having one end abutting against the plane face of the other carrier web, and a screw engaging each of said webs and thereby uniting said carrier parts.

In testimony whereof I have hereunto set my hand.

HARRIS B. HOLT.

Witnesses:
 PAUL N. CRITCHLOW,
 FRANCIS J. TOMASSON.